June 7, 1938.   F. E. LOVE   2,119,994
MERCHANDISE MECHANICAL SEALING AND RECORDING
Filed Nov. 10, 1936   2 Sheets-Sheet 1
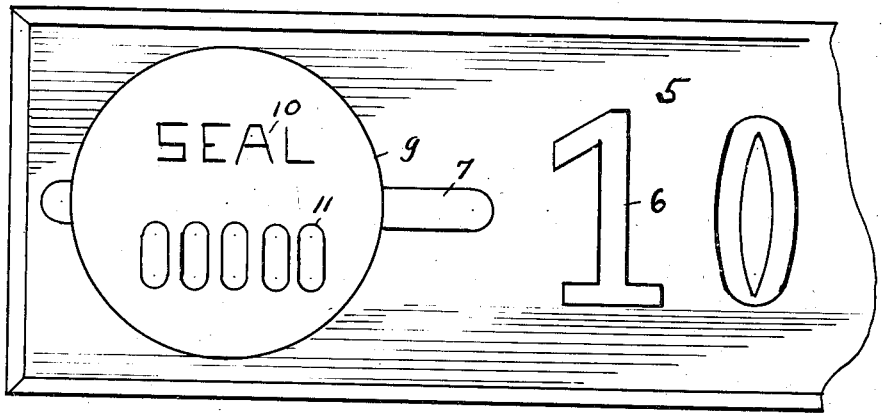
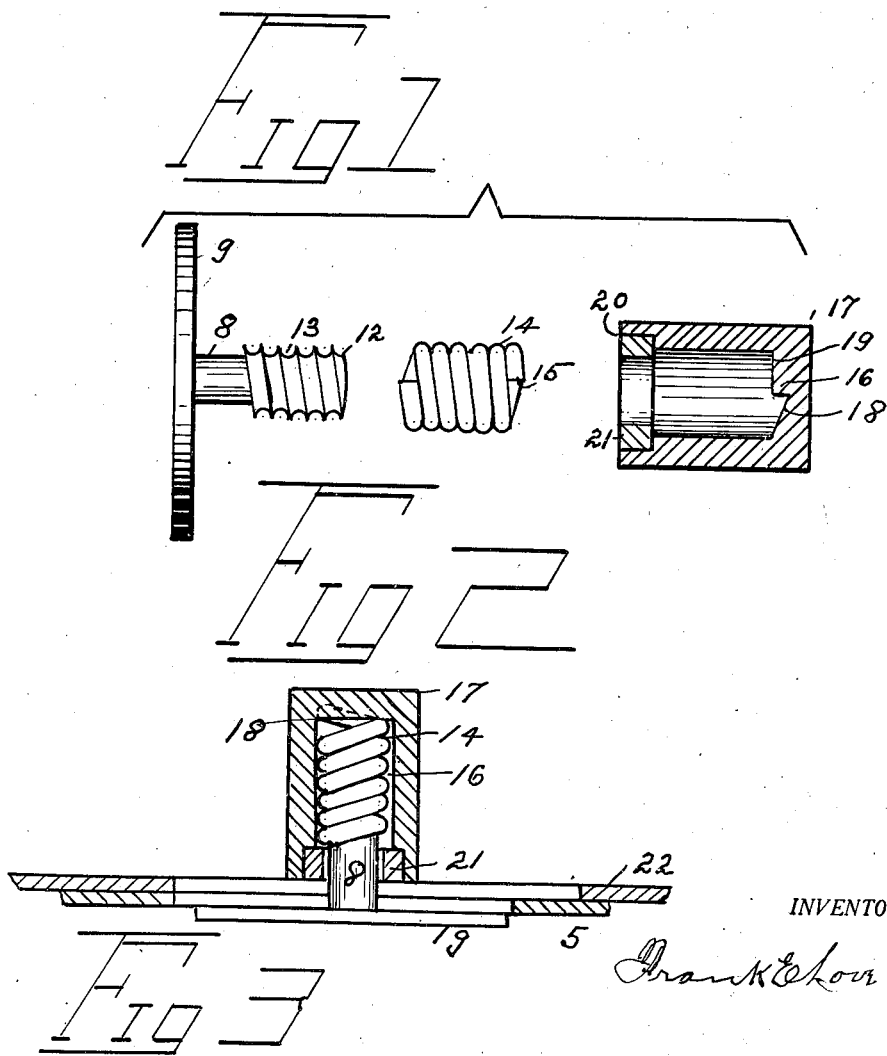
INVENTOR.
Frank E. Love June 7, 1938.  F. E. LOVE  2,119,994

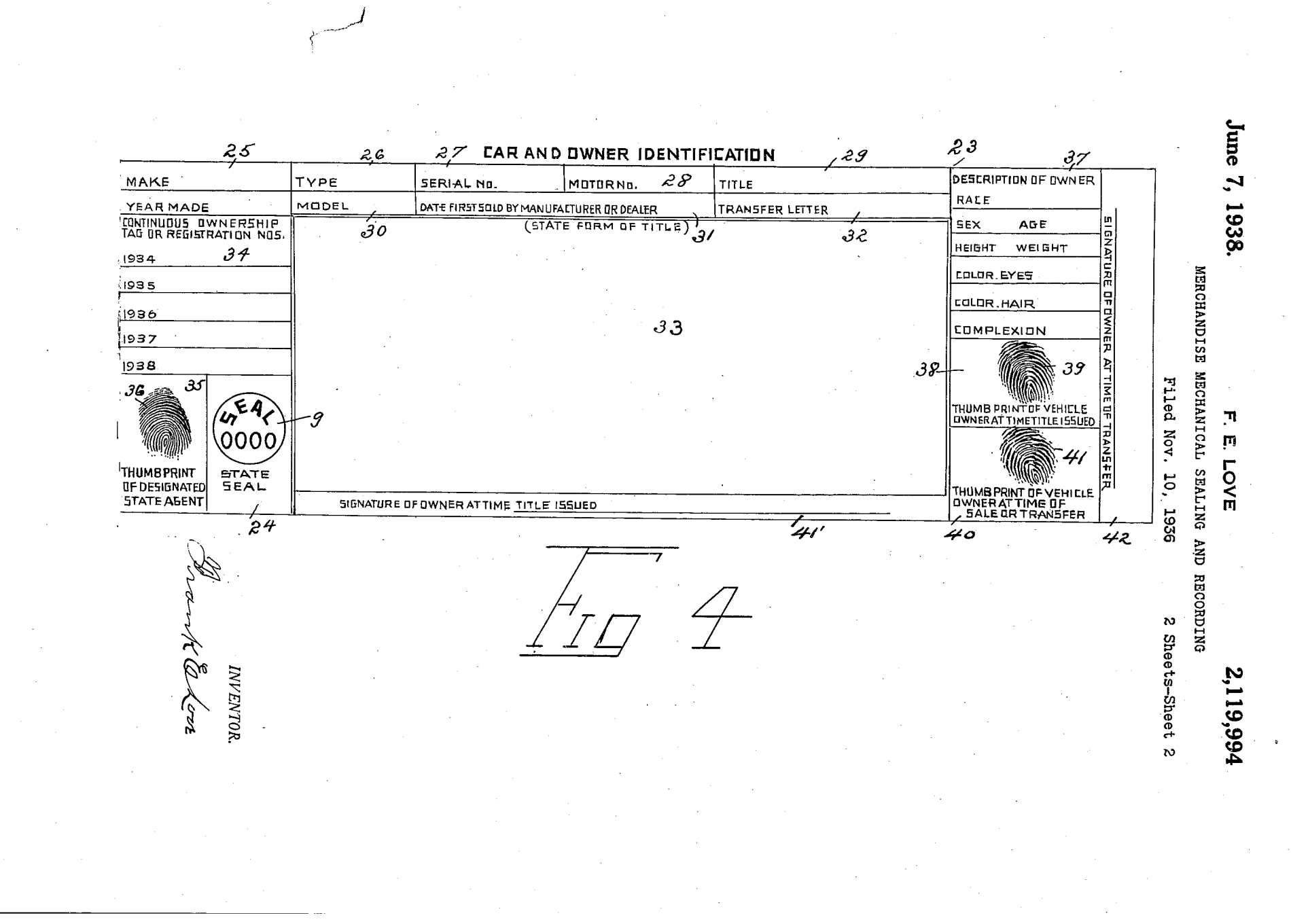

MERCHANDISE MECHANICAL SEALING AND RECORDING

Filed Nov. 10, 1936   2 Sheets-Sheet 2

Fig 4

INVENTOR.
Frank E Love

Patented June 7, 1938

2,119,994

UNITED STATES PATENT OFFICE 2,119,994

MERCHANDISE MECHANICAL SEALING AND RECORDING

Frank E. Love, Oklahoma City, Okla.

Application November 10, 1936, Serial No. 110,132

6 Claims. (Cl. 40—125)

This invention comprehends means for mechanically and recordably insuring an object against fraudulent sale, transfer, theft or passing of title from a legitimate owner, or his assignee, to one not entitled to such sale, or transfer without legal consideration.

It is an object of the invention to provide a seal for such purpose, to be applied by an authorized State agent or officer, and a record of the sealing transaction, the one not susceptible to be broken, and the other not capable of being mutilated without detection in each case, and by the elements of the invention.

It is another object of the invention to so apply the principle of the invention to vehicles, as to insure the fixed application of a license-plate thereto.

It is still a further object of the invention to prevent the removal or dissection of the mechanical elements without destroying not only the seal but the co-operative record thereof, which, of course, under a law which authorizes this sealing, will constitute a crime.

On the sheets of drawings, accompanying and forming a part of the specification, Figure 1 shows in elevation a fragment of a license-plate and the invention, so far as to the seal applied;

Figure 2 is a disassociated view in elevation, showing the elements constituting one of the preferred forms of the invention;

Figure 3 is a sectional view with the parts in assembly, and associated with a license-plate frame of a vehicle, and a license-plate;

Figure 4 is a view of a copy of certificate or form constituting a necessary record for use in connection with the mechanical feature of the insurance-device against sale, transfer, other than through legitimate channels, or theft.

In these several views, similar characters of reference will indicate similar parts.

The invention, while applicable to uses of various kinds, is shown, in the present instance, for convenience of illustration, as applicable to a vehicle license plate holding device. The license-plate, therefore, in a general way may be indicated by 5, and is provided with the usually required indicia 6. This license-plate has the usual elongated adjustment slots 7 through which, in the present instance, the shank 8 of a seal-plate 9 may pass, upon the face whereof is suitably inscribed, impressed, carved or molded the seal 10, the motor number 11 and such other statutory or desired indicia as may be necessary.

The shank 8 is provided with an extending spirally grooved head 12, the grooves whereof may be variously cut to suit mechanical requirements, and which in the present instance may be sufficiently undercut to provide bights 13, the wall whereof is so formed as to provide for the positive frictional engagement of a resilient keeper 14 so formed cross-sectionally as to insure complementary frictional engagement with the wall of the bight 13 so that after the grooved head 12 has once been forced into the keeper through a clockwise movement, this frictional engagement of the bight wall and the keeper 14 will prevent disengagement of both, due to the fact that the spirally arranged keeper will so sufficiently spread during the insertion of grooved head 12 as to cause pressure impingement of the keeper elements upon the walls of the bights 13. This will prevent the disengagement of the grooved element and thus insure a fixed frictional engagement between both especially at the instance of counter-clockwise movement of the seal 9.

This keeper 14 is of plural efficiency, and may be in the form of a strip, circular in cross-section, and is provided with an engaging free-end 15, the object whereof will be noticed when the parts are assembled.

This keeper 14 is placed in the bore 16 of a housing 17, one wall whereof is provided with a detent 18 for the reception of the end 15 when the seal is being turned clockwise, and thus, which so held in the detent 18, the keeper will receive the full length of the grooved head 12, and only is it releasable from the detent seat 18 when the grooved head 12 and the frictionally gripping keeper 14 are turned counterclockwise, when the free end 15 will pass along the cam wall 19 associated with the detent seat 18, and with each subsequent counter-clockwise revolution will snap into the detent and ride the cam wall, so that there is no means provided for arresting the movement of the keeper, during counter-clockwise movement to break the frictional engagement between the grooved head 12 and the keeper 14.

For the purpose of admitting the keeper 14 into the housing 17, the mouth of the bore in the housing may be of a size sufficient to permit the passage of the periphery of the keeper 14, and this mouth is provided with a seat 20 for the reception of a ring 21 which guides the body of the shank 8. Since the ring will be permanently fixed in the seat in any mechanical manner, it will be seen that when the parts are assembled, the seal may not be broken, except by destruction, and in violation of statute.

This sealing will be purchasable by the car owner from the State; the State official or agent will make the sealing effective under the law, and, of course, any destruction of the seal will naturally constitute a violation of such laws as shall be brought in to effect as authoritative for this sealing purpose.

Of course, it will be understood that although the description herewith sets forth the structure as shown in the drawings, and as applicable to a license plate for a vehicle, it is to be understood that such mechanical changes may be preferred as will best fit the device and its elements to the needs presented, and, it is also to be understood that the device may be appropriated to such sorts of sealings as may be found convenient within the purview of the invention.

In conjunction with this structure, and in further carrying out the sealing system, to prevent fraudulent passing of title or theft control of the item, or vehicle officially sealed, there is provided an accompanying official record and title sheet, as seen in Figure 4, and generally indicated at 23. It will be observed at 24 that a facsimile of the seal 9 set forth, substantially as above, is shown to institute the union of this record with the sealing operation of the vehicle, and for the application of the license-plate 5, and the sealing of the same, with the appliance above set forth will be prosecuted by the issuing officer who will associate the record sheet 24 with the seal 9.

Each State, of course, may care to provide its own form of record, and the following description of the form illustrated may constitute a preferred form, since the arrangement is to be such as to cause the sealing of the license-plate to be a part of a permanent record. Therefore, as an illustration, the make of the car will be recorded in the space provided at 25; the next logical identification will be the type of car as at 26, following which will be the vehicle serial number at 27. The motor number at 11 on the seal plate 9 will appear also in column 28, and the title information will be recorded in space 29.

The car model is registered at 30, while the initial car purchased from manufacturer or dealer is recordable at 31, the transfer invoice or letter appearing at 32. All State information, in accordance with State statutes will appear at 33.

The ownership continuations of license plate or registration numbers for the successive years will be registered in column 34, it being understood, in this connection, that each transfer will call for an additional and new certificate.

Below this continuation column will appear at 35 the thumbprint 36 of the State official issuing the license-plate and sealing the same in place officially and this thumb-print will be in proximity with the facsimile of the seal 9 in the space 24. For record purposes, the race, sex, age, height, weight, color of eyes, color of hair, and complexion of the person to whom the license has been issued will appear in column 37 which is in proximity with a space 38 for the reception of the thumbprint 39 of the person whose characteristics have been set forth in column 37. A space 40 is provided at space 38 which is left blank on the issue of the license and seal, and which space is thumb-printed by the owner of the car when a re-sale or transfer of the property is consummated. When this is done, then the new owner of the property, secures his certificate and seal placing his thumbprint in space 38, leaving space empty until he makes a sale when the operation is of course repeated, at 41 and as often so as a resale or transfer is made.

At 41' the signature of the owner will appear, at the time of title issue, and at the time of transfer of the property, the same signature will appear in the space 42 where it is in proximity with the description of the owner column and the owner finger-prints appear.

Now it will be seen that there is provided means whereby a license plate may be applied to an object by an indestructible seal which can not be removed without completely destroying the seal. This seal is identified by a supplemental record sheet, with the finger-print of the official sealer, and that of the person for whom the item has been sealed.

Having thus set forth the invention, I claim:

1. A device of the kind set forth, consisting of a housing, a cam wall within the housing terminating in a seat, a resilient keeper having a free end forced along said cam wall for contact with said seat, a bighted head for co-operation frictionally with said keeper, a shank for said bighted head, a ring securing the resilient keeper in said housing, and a seal plate carried by said shank.

2. In a device of the kind set forth, the combination with an internally bored housing, a seat in said housing, a cam wall in conjunction with said seat, a keeper in said housing and having an end co-operating with said seat upon clockwise movement of the keeper, a spirally grooved head insertable in said keeper and having bights for frictional engagement with the keeper, a shank for said head, a seal plate carried by said shank, means to hold the keeper in place, said cam wall permitting the free end of the keeper to release from the seat upon counterclock-wise movement of the seal plate.

3. In a device as set forth, the combination with a seal-plate, of a shank extending therefrom, a spirally bighted head associated with said shank, a resilient and distensible keeper for said spirally bighted head, having elements for frictionally engaging the bights, a housing for the head and the keeper, means within the housing for guiding the shank, a seat within the housing, a cam wall located in the rear wall of the housing and slanting from the rear of the seat to the inner wall of said housing, and means carried by the keeper for engaging the seat when the head and keeper are rotated clock-wise.

4. In a device, as set forth, the combination with a seal-plate, a license plate, a license plate frame, of a shank for said seal plate and passing through openings in the license-plate and license plate frame, a housing to the rear of said license-plate frame, and having a bore, a seat associated with said bore, a cam wall leading from said seat to the inner wall of the housing, a keeper within said housing, a retaining end proceeding from the keeper and adapted on the clock-wise movement of the keeper to ride said wall and engage said seat, a bighted head on the shank for frictional engagement with said keeper and spreading the latter to increase frictional engagement between the bighted head and said keeper, and means to retain the keeper within the housing and also serving as a guide for the shank.

5. In a device of the kind set forth, the combination with a housing, a cam wall within said housing at the rear thereof, and receding angularly with relation to the rear wall from the inner face thereof to the inner portion of a projection from the cam wall, said projection forming a keeper seat, a resilient keeper adapted to be guided by the cam wall to rest position upon said seat projection, a bighted head for frictionally engaging with the keeper upon clockwise movement of the head after the keeper end is arrested upon the projection to the rear of the inner wall of the housing, a shank for said bighted head, a flange formed on the housing for retaining the keeper within the housing, and a seal plate carried by the shank.

6. A device of the kind set forth, consisting of a housing, a cam wall within the housing and receding angularly from the inner wall of the housing, a seat at the base of the receding wall, a resilient keeper having a free end for contact with said cam wall and said seat, a bighted head for co-operating frictionally with said resilient keeper, a shank for said bighted head, a flange formed on one wall of the housing for holding the resilient keeper within the housing, a seal plate carried by the shank, the bights of the head frictionally gripping the keeper on clockwise movement of the head and when the keeper end presses upon the seat within the rear wall of the housing.

FRANK E. LOVE.